United States Patent [19]

Meyer

[11] Patent Number: 5,415,132

[45] Date of Patent: May 16, 1995

[54] PET TUG TOY

[76] Inventor: Patricia A. Meyer, 2832 Dudley, Lincoln, Nebr. 68503

[21] Appl. No.: 218,085

[22] Filed: Mar. 25, 1994

[51] Int. Cl.6 .................................................. A01K 29/00
[52] U.S. Cl. ........................................................ 119/707
[58] Field of Search ............... 119/707, 709, 711, 758, 119/769, 798; 446/369, 370, 451, 490

[56] References Cited

U.S. PATENT DOCUMENTS

| | | |
|---|---|---|
| 704,730 | 7/1902 | Zierleyn .................................. 119/769 |
| 2,194,736 | 3/1940 | de Bruler ................................ 119/709 |
| 2,862,330 | 12/1958 | Malsed ................................... 446/451 |
| 3,315,640 | 4/1967 | Gamble . |
| 3,441,005 | 4/1969 | Fink ....................................... 119/798 |
| 3,476,086 | 10/1967 | Way . |
| 3,571,970 | 3/1971 | Dunn et al. ........................... 446/451 |
| 3,727,583 | 4/1973 | Muraro . |
| 3,830,202 | 8/1974 | Garrison ................................ 119/709 |
| 4,074,657 | 2/1978 | Senior et al. . |
| 4,321,888 | 3/1982 | Topliffe . |
| 4,803,953 | 2/1989 | Graves .................................. 119/707 |
| 5,092,272 | 3/1992 | O'Rourke ............................ 446/490 |
| 5,174,243 | 12/1992 | O'Rourke .............................. 433/1 |

Primary Examiner—Robert P. Swiatek
Attorney, Agent, or Firm—Zarley, McKee, Thomte, Voorhees & Sease; Mark D. Frederiksen

[57] ABSTRACT

A tug toy for a pet includes a generally animal shaped weight portion, with a body and head, and an elastic cord connected at one end to the weight portion and connected at the other end to a pet toy. The body and head of the weight portion are stuffed with fiber, and a weight member is mounted generally centrally within the body portion. The elastic cord is attached to the body portion immediately adjacent a mouth portion formed on the head of the weight portion.

7 Claims, 4 Drawing Sheets

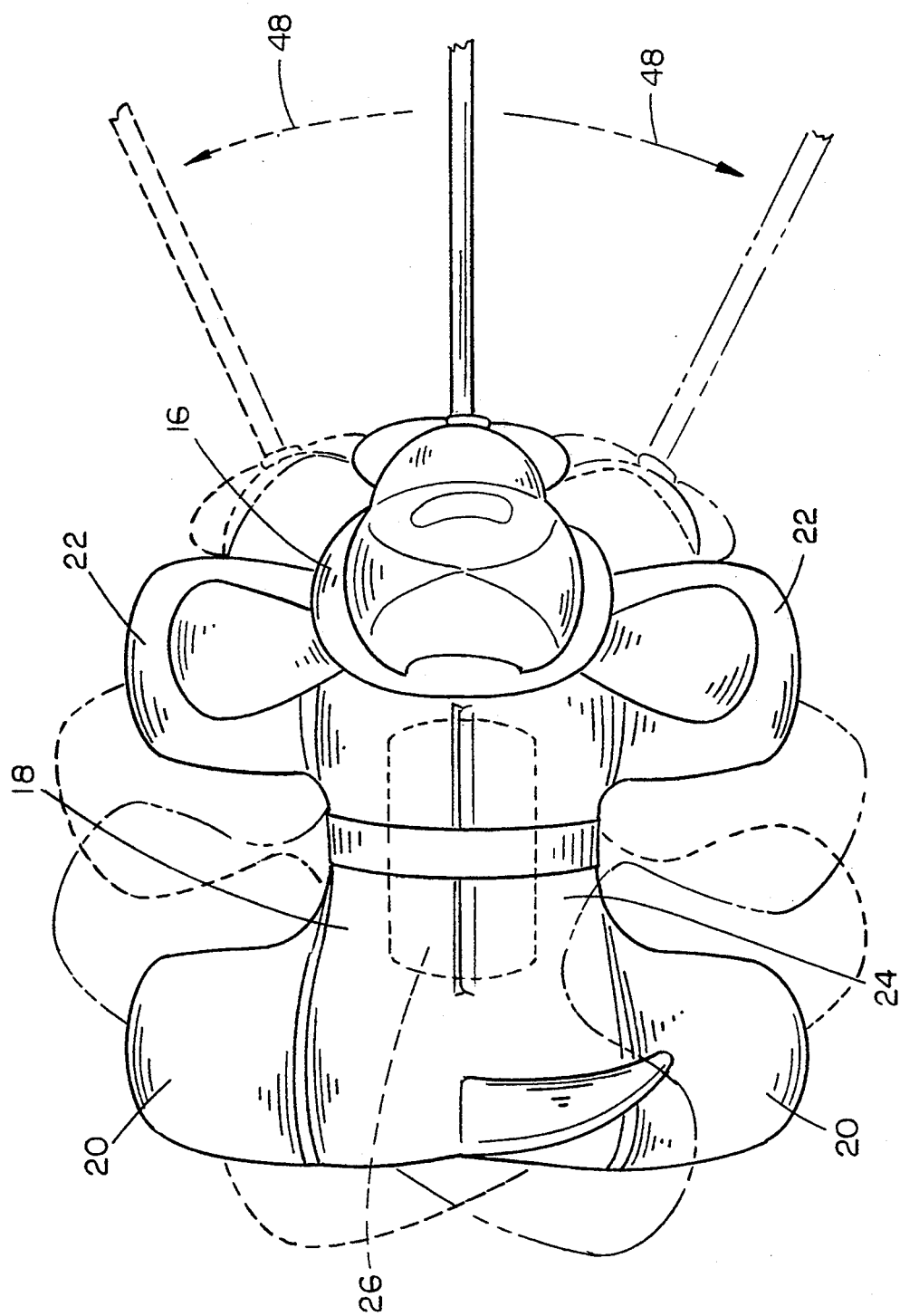

PET TUG TOY

TECHNICAL FIELD

The present invention relates generally to toys which promote the exercise of domestic pets, and more particularly to an improved pull toy which permits a pet to play without assistance.

BACKGROUND OF THE INVENTION

Various types and configurations of pet toys have been known and widely used for many years. Tug toys or pull toys typically require a human to grasp one end of the toy, while the pet, typically a dog, pulls on the opposing end of the toy. While such toys have proved satisfactory for their intended purpose, they require human participation in order to operate.

Other toys available for pets, such as balls or chew toys, permit the pet to exercise and play without human assistance, but may easily be lost or "hidden" by the pet.

SUMMARY OF THE INVENTION

It is therefore a general object of the present invention to provide an improved tug toy for a pet.

Yet another object is to provide a pet tug toy which permits pet interaction without human assistance.

Yet another object is to provide a pet tug toy which will incite the curriosity of the animal yet is not easily lost by the pet.

These and other objects will be apparent to those skilled in the art.

The tug toy for a pet of the present invention includes a generally animal shaped weight portion, with a body and head, and an elastic cord connected at one end to the weight portion and connected at the other end to a pet toy. The body and head of the weight portion are stuffed with fiber, and a weight member is mounted generally centrally within the body portion. The elastic cord is attached to the body portion immediately adjacent a mouth portion formed on the head of the weight portion.

BRIEF DESCRIPTION OF THE DRAWINGS

FIG. 5 is a top plan view of the weight portion of the invention, showing operation thereof.

DESCRIPTION OF THE PREFERRED EMBODIMENT

Figure 1:
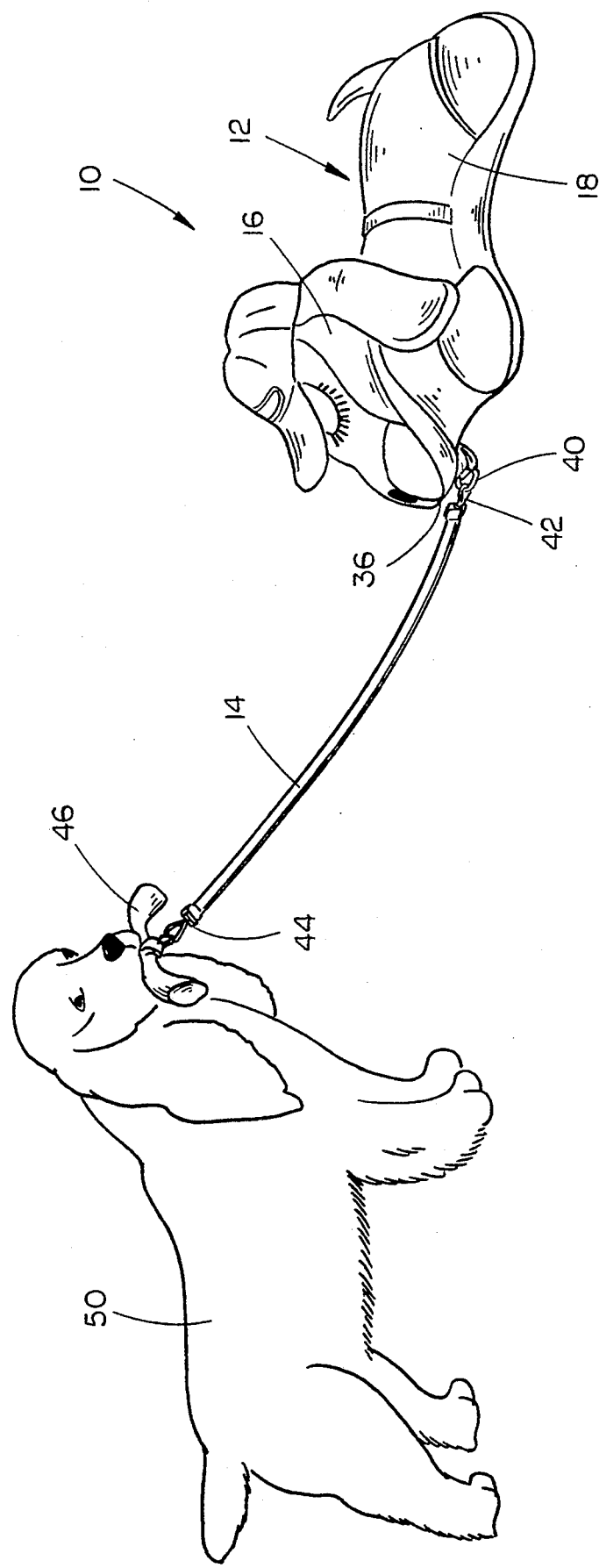
FIG. 1 is a pictorial view of the pet tug toy of the present invention with a toy interacting therewith.

Referring now to the drawings, in which similar or corresponding parts are identified with the same reference numeral, and more particularly to FIG. 1, the pet tug toy of the present invention is designated generally at 10 and includes a weight portion 12 and an elastic cord 14 attached to the weight 12.

Referring now to FIGS. 2-5, weight portion 12 is preferably formed as a stuffed animal with a head 16 and body 18. As shown in FIG. 5, body 18 is generally dog-bone shaped, or H-shaped, with a pair of opposing rear legs 20, a pair of opposing front legs 22 and an intermediate trunk portion 24 oriented perpendicularly to legs 20 and 22 and connecting them together.

Figure 2:
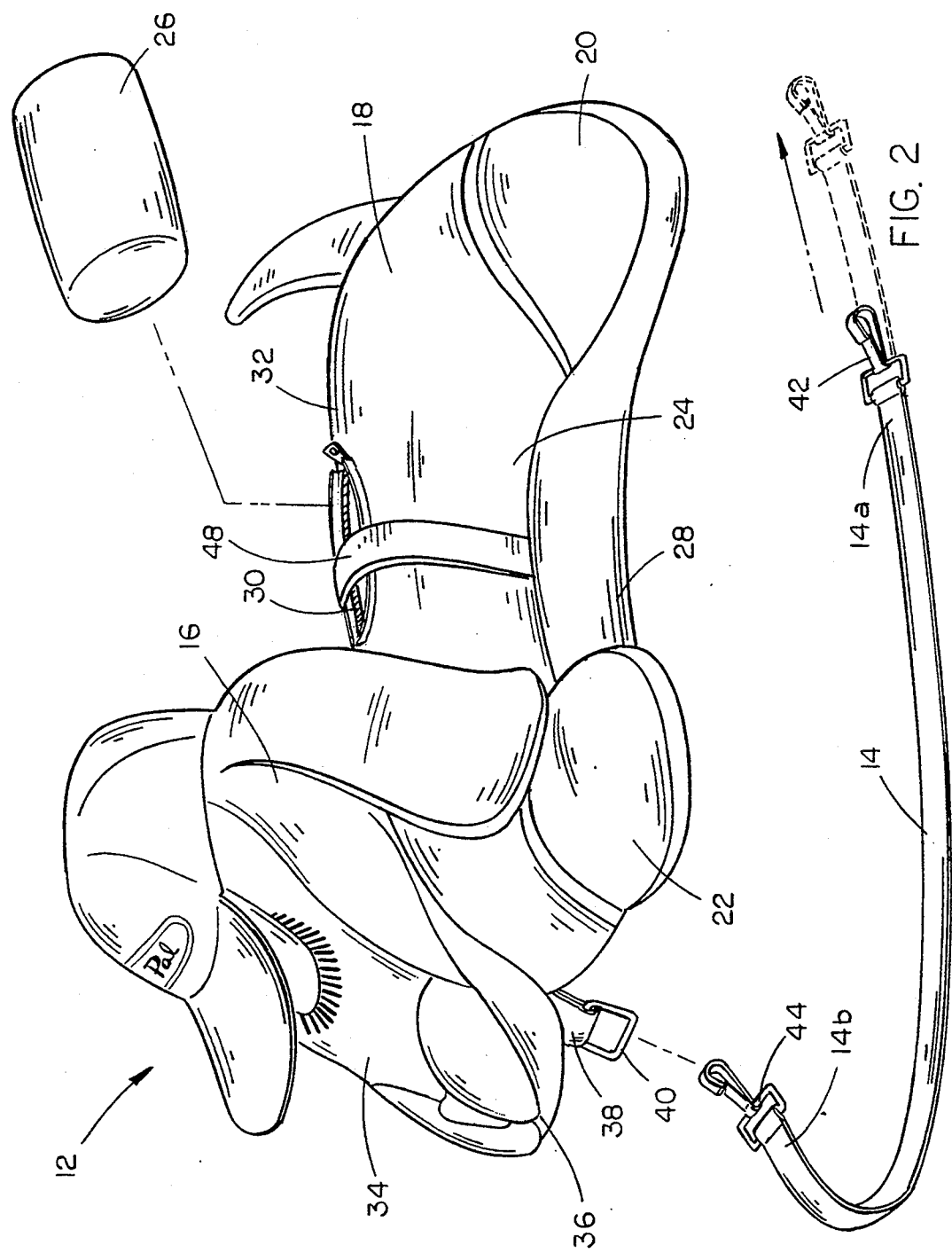
FIG. 2 is an enlarged pictorial view of the tug toy of the present invention.
Figure 3:
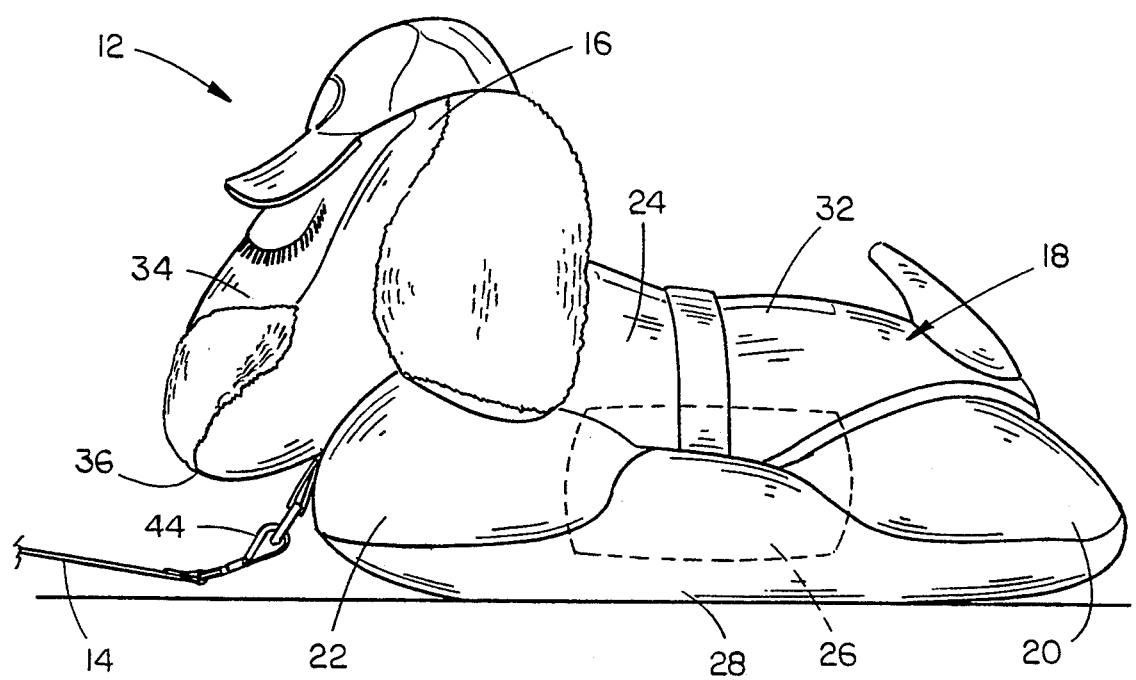
FIG. 3 is a side elevational view of the weight portion of the invention.

FIGS. 2, 3 and 5 show a high density weight 26 which is placed within the trunk 24 of body 18 intermediate front and rear legs 22 and 20 and preferably located adjacent the bottom 28 of body 18. Weight 26 may be a concrete block, a sand filled bag, or any other high density substance, but is preferably enclosed within a padded material before placement within body 18.

While weight 26 may be affixed within body 18 by sewing, preferably a zipper 30, or similar closable opening, is formed in the upper surface 32 of trunk 24, directly above the desired location of weight 26. Zipper 30 permits weight 26 to be removed and replaced with heavier or lighter weights, as desired.

Figure 4:
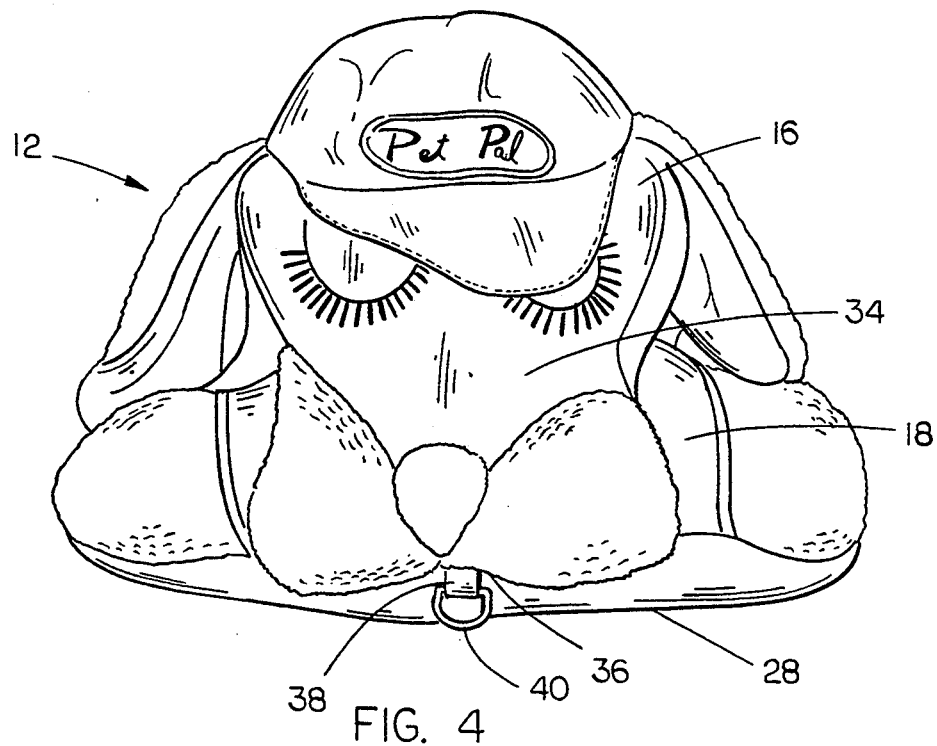
FIG. 4 is a front elevational view of the weight portion of the invention.

Referring now to FIGS. 3 and 4, head 16 is mounted to the forward end of body 18 and preferably includes a forwardly directed face 34 with a mouth portion 36 located at the lower end of the head 16, and projecting forwardly of body 18. Mouth portion 36 may simply be drawn on head 16, or include fabric depicting a mouth opening or the like.

A strap 38 affixes a ring 40 to the forward end of body 18, directly below the mouth portion 36 of head 16, as shown in FIGS. 2 and 4. The positioning of ring 40 relative to head 16 is important, as will be described in more detail hereinbelow.

Elastic cord 14 includes a releasable snap 42 mounted to a forward end 14a thereof, and a similar releasable snap 44 mounted to the rearward end 14b, as shown in FIG. 2. Snap 42 permits releasable attachment to ring 40, while snap 44 permits releasable attachment to any of a variety of pet toys 46, as shown in FIG. 1.

A carrying handle 48 is attached to body 18 to permit simple transportation of weight portion 12, as shown in FIG. 2. Handle 48 is preferably formed of a strap connected at opposite ends to opposing sides of trunk 24, generally located over weight 26. Thus, handle 48 is generally located over the center of gravity of weight portion 12.

Referring once again to FIGS. 3 and 4, it can be seen that bottom 28 of body 18 is preferably curved upwardly from the central portion towards the forward and rearward ends and the opposing sides of the body 18. This reduces the total surface area of bottom 28 which is in frictional contact with the ground, thereby permitting pivotal movement within a horizontal plane about the general center of gravity, as shown by arrows 48 in FIG. 5.

In operation, elastic cord 14 has one end connected to ring 40 on weight portion 12, and the opposite end connected to a dog toy 46. The elasticity of cord 14 permits a dog 50 to tug and pull on toy 46 and thereby stretch cord 14. Weight portion 12 is preferably of a sufficient weight to maintain weight portion 12 in position as the pet 50 pulls on toy 46. As shown in FIG. 4, the location of ring 40 directly under the mouth portion 36 of head 16 makes it appear to the dog 50 that the stuffed animal 12 is pulling on the opposite end of cord 14. As the pet attempts to "circle" its playmate, body 18 will pivot, as shown in FIG. 5, such that head 16 always faces the pet 50 (as shown in FIG. 1).

Thus, it can be seen that the tug toy 10 of the present invention provides a "playmate" for a pet 50 which will play "tug-of-war" at any given time. The elastic cord 14 and pivotability of body portion 18 allow the pet 50 to exercise and play without the need for human assistance.

Whereas the invention has been shown and described in connection with the preferred embodiment thereof, it should be understood that many modifications, changes and additions may be made which are within the intended broad scope of the appended claims.

I claim:

1. A tug toy for a pet, comprising:
   a weight portion having forward and rearward ends and a predetermined weight for frictional contact with the ground;
   said weight portion being formed in the shape of an animal and including a body portion having forward and rearward ends, top and bottom surfaces, and opposing sides;
   said weight portion further including a head portion connected to the forward end of the body portion;
   said body and head portions being formed of fabric stuffed with low density fiber;
   a high density weight member mounted within the body portion;
   an elastic cord having a rearward end connected to the forward end of the weight portion; and
   means on a forward end of the cord for removably connecting a pet toy thereto.

2. The tug toy of claim 1, wherein the weight member is located generally centrally between the forward and rearward ends and the opposing sides of the body portion.

3. The tug toy of claim 2, wherein the weight member is located closer to the body portion bottom surface than the top surface, so as to lower the center of gravity of the body portion.

4. The tug toy of claim 2, wherein the bottom surface of the body portion curves upwardly along the forward and rearward ends and opposing sides.

5. The tug of claim 1, further comprising a selectively closable opening in the body portion, said weight member being removably mounted in said body portion.

6. The tug toy of claim 1, further comprising a handle means mounted on the body portion for permitting lifting and transport of the weight portion.

7. The tug of claim 6, wherein said handle means includes a strap with opposing ends connected to the opposing sides of the body portion, said strap located generally over the center of gravity of the weight portion.

* * * * *